No. 661,825. Patented Nov. 13, 1900.
W. C. STEPHENS.
ROCK DRILLING ENGINE.
(Application filed May 14, 1900.)
(No Model.)

Witnesses:
J. K. Moore
B. W. Brockett

Inventor:
William Charles Stephens
By Whitaker & Prevost
Attys

UNITED STATES PATENT OFFICE.

WILLIAM CHARLES STEPHENS, OF CARN BREA, ENGLAND.

ROCK-DRILLING ENGINE.

SPECIFICATION forming part of Letters Patent No. 661,825, dated November 13, 1900.

Application filed May 14, 1900. Serial No. 16,627. (No model.)

*To all whom it may concern:*

Be it known that I, WILLIAM CHARLES STEPHENS, a subject of the Queen of Great Britain, residing at Carn Brea, in the county of Cornwall, England, have invented new and useful Improvements in Rock-Drilling Engines, of which the following is a specification.

This invention relates to improvements in or connected with percussive drills of the kind described in the specification of British Letters Patent No. 1,674 of 1896. In the said specification there is described a device for preventing the leakage of the exhaust fluid from the valve-chest before the piston has arrived at the position when the said fluid can pass into the circumferential groove around the said piston before escaping into the atmosphere. This device consisted of a bushing or plug, (referred to in the said specification as an "auxiliary valve,") the said bushing being made of leather, fiber, asbestos, wood, or other suitable elastic or compressible material and being fitted into the port or passage through which the exhaust fluid escaped from the valve-chest into the circumferential groove around the piston in such a manner that it formed a packing with which the piston made permanent contact, thus preventing the leakage of the exhaust fluid. Now I have found in practice that such bushings have a tendency to swell and close up, thus injuriously contracting the passage in the same through which the fluid escapes, and this invention has for its object to so construct the bushings that this contraction is obviated. To this end I provide in connection with the bushing, which is advantageously made of leather, an internal lining of a suitable rigid material, such as a soft metal, the said lining being inserted into the conical passage formed in the bushing and by its rigidity preventing the contraction of the passage through the said bushing.

Figure 1:
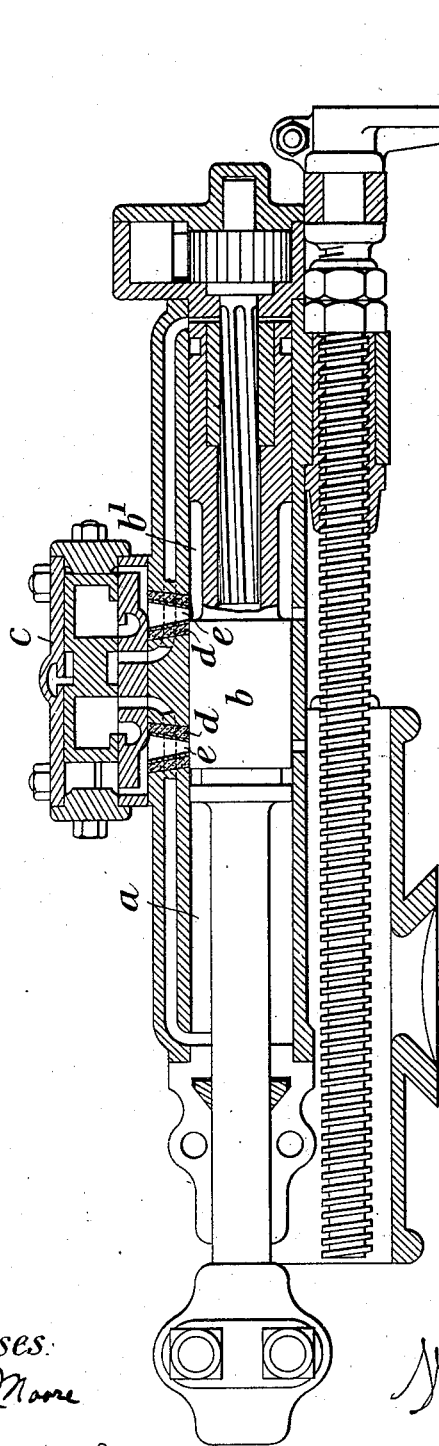
Figure 5:
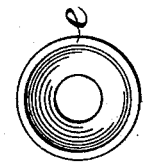
Figure 4:
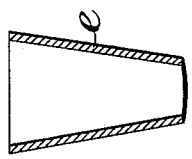
Figure 3:
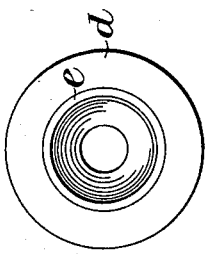
Figure 2:
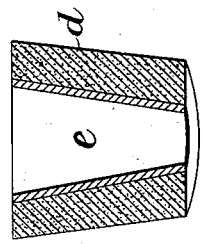

In the accompanying drawings, Figure 1 is a sectional elevation of a percussive rock-drill having my improved auxiliary lining or bushing applied thereto. Fig. 2 is a vertical section of a bushing drawn to a larger scale. Fig. 3 is a plan view thereof, and Figs. 4 and 5 are views similar to Figs. 2 and 3 of the lining which I apply to the bushing.

$a$ is the cylinder of the drill, $b$ the piston, and $c$ the valve-chest, all these parts being of ordinary construction.

$d\ d$ are the bushings, which are advantageously made of leather and are inserted in the manner above described into the ports leading from the valve-chest $c$ into the circumferential groove $b'$ around the piston $b$.

$e$ is the metal lining, which is fitted into the bushing $d$. This lining is shown separately in Figs. 4 and 5 and is made of a conical shape to conform to the central passage made in the bushing $d$, into which it is merely passed in such a manner that its ends are flush with the ends of the bushing, as clearly shown. An auxiliary lining or bushing made in this manner cannot, as will be clear, expand inwardly, so as to tend to close the passage through the bushing, as is the case with the bushing when made as described in the specification of the above-mentioned British patent.

To provide against the wear of the elastic bushing, I can furnish it with an external sheath of metal or other suitable material.

Having now particularly described and ascertained the nature of my said invention and in what manner the same is to be performed, I declare that what I claim is—

1. A bushing for the ports of percussive drills and the like consisting of an elastic compressible portion and means for preventing the lateral expansion thereof, substantially as described.

2. In a rock-drill, the employment in the exhaust-passage of an elastic and compressible bushing having a central passage provided with a lining of a suitable rigid material such as metal, substantially as described.

3. A bushing for the ports of percussive drills and the like consisting of the elastic compressible portion and a tapering metal lining therefor adapted to retain said elastic compressible bushing in a compressed state, substantially as described.

WILLIAM CHARLES STEPHENS.

Witnesses:
GEORGE H. FOX,
WILLIAM H. DANIELL.